United States Patent
Miyajima (10) Patent No.: US 9,288,378 B2
(45) Date of Patent: Mar. 15, 2016

(54) AUTOFOCUS APPARATUS

(71) Applicant: CANON KABUSHIKI KAISHA, Tokyo (JP)

(72) Inventor: Shunsuke Miyajima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 261 days.

(21) Appl. No.: 13/896,402

(22) Filed: May 17, 2013

(65) Prior Publication Data

US 2013/0308038 A1 Nov. 21, 2013

(30) Foreign Application Priority Data

May 21, 2012 (JP) .................... 2012-115283

(51) Int. Cl.
*H04N 5/232* (2006.01)
*G02B 7/34* (2006.01)
*G03B 3/10* (2006.01)

(52) U.S. Cl.
CPC .............. *H04N 5/23212* (2013.01); *G02B 7/34* (2013.01); *G03B 3/10* (2013.01)

(58) Field of Classification Search
CPC combination set(s) only.
See application file for complete search history.

(56) References Cited

U.S. PATENT DOCUMENTS

| | | | |
|---|---|---|---|
| 4,969,003 A | 11/1990 | Ohnuki et al. | |
| 5,477,302 A | 12/1995 | Ogasawara | |
| 5,585,883 A | 12/1996 | Yamano | |
| 5,587,762 A | 12/1996 | Watanabe | |
| 5,619,300 A | 4/1997 | Watanabe et al. | |
| 2010/0278520 A1* | 11/2010 | Karasawa | G02B 7/282 396/95 |
| 2011/0267706 A1* | 11/2011 | Karasawa | H04N 5/23212 359/698 |
| 2012/0237193 A1* | 9/2012 | Kawarada | G02B 7/34 396/95 |

FOREIGN PATENT DOCUMENTS

EP  2 246 721 A2  11/2010
JP  2001021794 A  1/2001

OTHER PUBLICATIONS

Extended European Search Report for corresponding EP 13002550.5, dated Sep. 20, 2013.
Extended European Search Report for corresponding EP 13002550.0, dated Sep. 20, 2013.

* cited by examiner

*Primary Examiner* — Roberto Velez
*Assistant Examiner* — Tuan Le
(74) *Attorney, Agent, or Firm* — Rossi, Kimms & McDowell LLP (57) ABSTRACT

An autofocus apparatus includes a target position calculator for calculating a focus lens target position based on a defocus amount obtained based on the signal of focus detector of a phase difference detecting type and a focus lens position, a target position memory for storing the target position, a speed calculator for calculating an object speed in an optical axis direction based on a present target position, the previous target position, and time period between calculations of present target position and prior target position, and a lens controller for setting, when the object speed changes, a focus lens drive speed based on the present target position, the focus lens position and the object speed and setting, when the object speed does not change, the focus lens drive speed based on a present drive speed, a present defocus amount, and a previous defocus amount.

12 Claims, 9 Drawing Sheets

AUTOFOCUS APPARATUS

BACKGROUND OF THE INVENTION

1. Field of the Invention

The present invention relates to an autofocus apparatus to be used for an optical apparatus such as a television camera lens or a video lens, and more particularly, to an autofocus apparatus to be used for an optical apparatus having an autofocus function and including a phase difference detecting type focus detector.

2. Description of the Related Art

Hitherto, various proposals have been made for autofocus (AF) technology for an image pickup apparatus such as a camera or a video camera. For instance, there is well known an autofocus method in which light beams from an object after passing through different exit pupil areas of an image pickup lens are focused to form an image on a pair of line sensors, and a defocus amount is calculated to drive the image pickup lens.

Japanese Patent Application Laid-Open No. 2001-021794 discloses a method of predicting a future image plane position by using a given function based on one of a focal length of an image pickup lens, an object distance, an object speed, an object acceleration, an image plane distance, an image plane speed, and an image plane acceleration, or a combination thereof.

In moving image photography using a camera or a video camera, it is necessary to adjust focus so that an object image is always within a depth of field. However, the conventional technology disclosed in Japanese Patent Application Laid-Open No. 2001-021794 does not consider individual variation of lens driving performance or a photographing condition which affects lens driving performance because the image pickup lens is driven based on the given function. In addition, because it is a precondition to take still images, it is not adaptive to taking moving images using a camera or a video camera.

Figure 9:
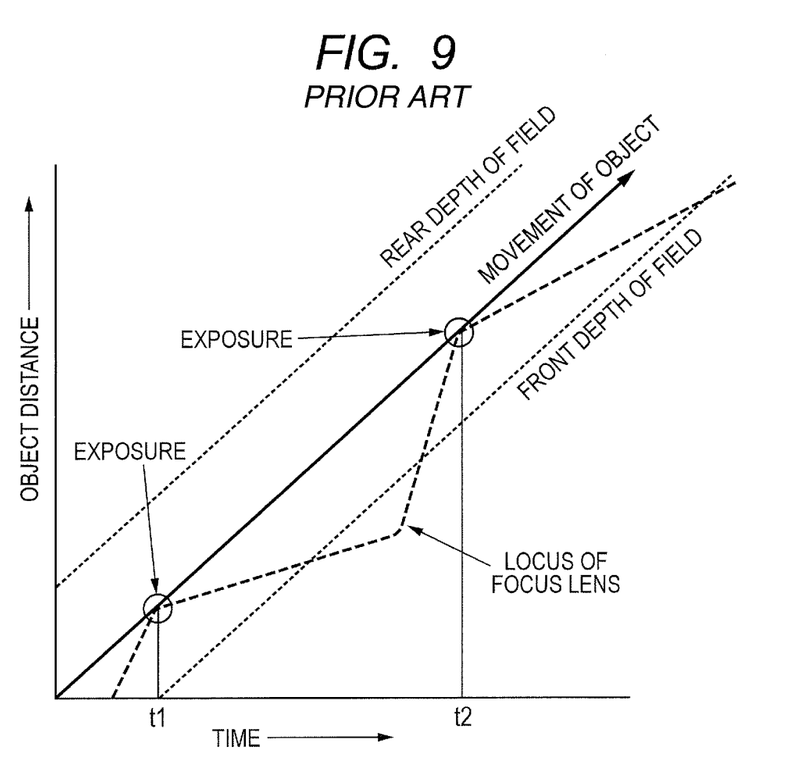
FIG. 9 shows a locus of a focal length of a conventional lens.

FIG. 9 shows a locus of a focus position of a lens with respect to an object moving in an optical axis direction. In FIG. 9, the vertical axis represents an object distance, and the horizontal axis represents time. In FIG. 9, at points of time t1 and t2 as exposure points, an in-focus state is realized. However, in a period between the points of time t1 and t2 during which the exposure point is not reached, the in-focus state in which the focus position of the lens corresponds to the object position within the depth of field cannot be maintained.

SUMMARY OF THE INVENTION

Therefore, the present invention provides an autofocus apparatus that can always maintain an in-focus state regardless of an object speed or an object distance.

In order to achieve the above-mentioned object, according to an exemplary embodiment of the present invention, there is provided an autofocus apparatus, including: a target position calculator for calculating a target position of a focus lens based on a defocus amount obtained based on a signal from the focus detector of a phase difference detecting type and a position of the focus lens obtained by a position detector; a target position memory for storing the target position calculated by the target position calculator; an object speed calculator for calculating an object speed in an optical axis direction based on a present target position, a target position calculated prior to calculating of the present target position, and one of a target position calculation time consumed from a time at which the target position calculator calculates the target position calculated prior to calculating of the present target position to a time at which the target position calculator calculates the present target position and a time regarded as equivalent to the target position calculation time; a first drive speed setting unit for setting a drive speed of the focus lens based on the present target position, the position of the focus lens and the object speed; a second drive speed setting unit for setting the drive speed of the focus lens based on a present drive speed of the focus lens, a present defocus amount, and the defocus amount obtained prior to obtaining of the present defocus amount; and a lens controller for determining whether or not the object speed changes, and for driving, when it is determined that the object speed changes, the focus lens based on the drive speed set by the first drive speed setting unit, and driving, when it is determined that the object speed does not change, the focus lens based on the drive speed set by the second drive speed setting unit.

According to the present invention, it is possible to provide the autofocus apparatus that can always maintain the in-focus state of the object moving in the optical axis direction, regardless of the object speed or the object distance. In addition, it is possible to provide an autofocus apparatus that can always maintain the in-focus state of the object moving in the optical axis direction, regardless of an environmental change or a temporal change of lens characteristics, by relatively adjusting the focus lens drive speed based on an increase or decrease of the defocus amount.

Further features of the present invention will become apparent from the following description of exemplary embodiments with reference to the attached drawings.

DESCRIPTION OF THE EMBODIMENTS

In the following, exemplary embodiments of the present invention are described in detail with reference to the attached drawings.

First Embodiment

Figure 1:
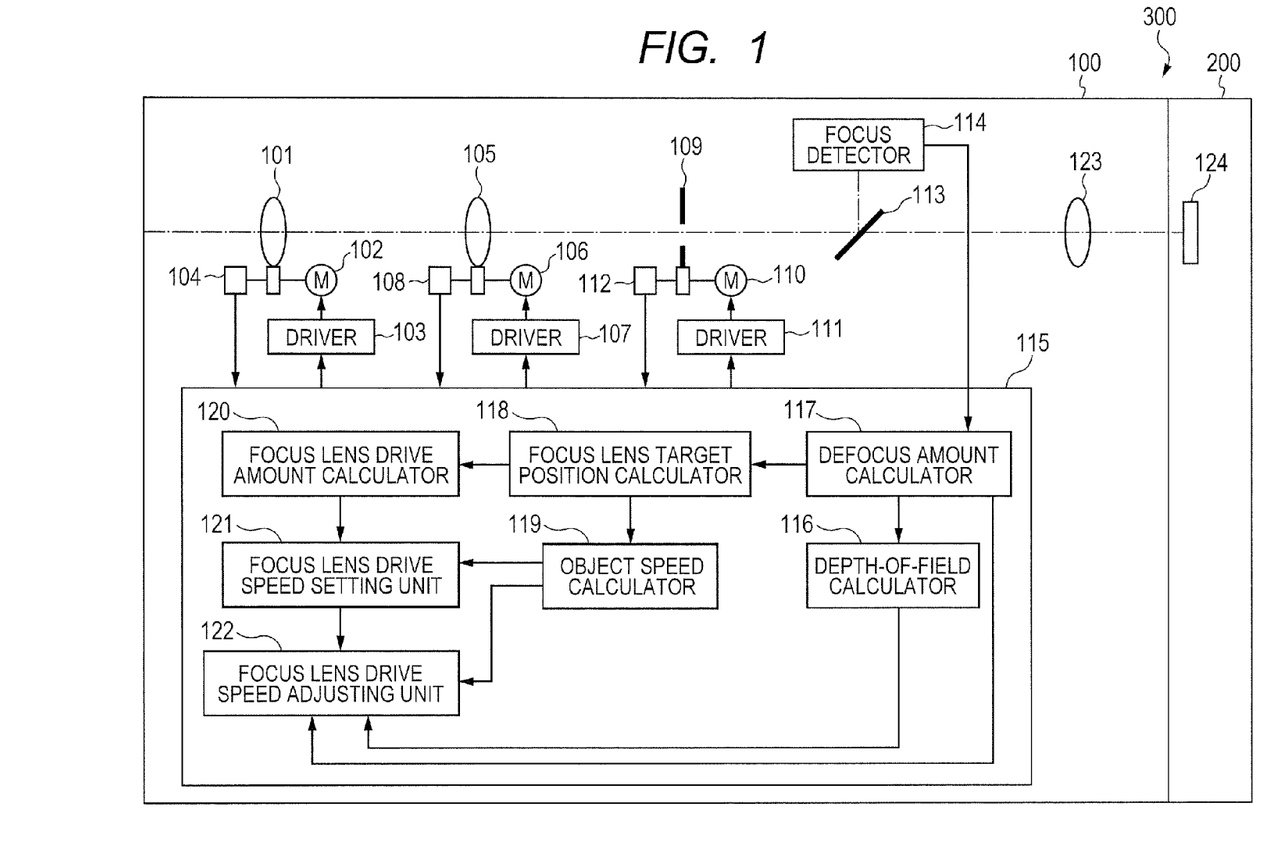
FIG. 1 is a configuration diagram of a first embodiment of the present invention.

FIG. 1 illustrates a configuration of a lens apparatus 100 as an autofocus apparatus according to a first embodiment of the present invention. The lens apparatus 100 and a camera apparatus 200 constitute an image pickup apparatus 300. The lens apparatus 100 includes an optical system including a focus lens 101. The lens apparatus 100 moves the focus lens 101 in an optical axis direction so as to change a position of an image plane of the lens apparatus 100.

The focus lens 101 is connected to a focus motor 102. The focus motor 102 is driven by a focus driver 103 so as to move the focus lens 101 in the optical axis direction. The focus motor 102 and the focus driver 103 constitute a focus lens drive unit. A position of the focus lens 101 is detected by a focus lens position detector 104.

A zoom lens 105 moves in the optical axis direction so as to change a focal length of the lens apparatus 100. The zoom lens 105 is connected to a zoom motor 106. The zoom motor 106 is driven by a zoom driver 107 so as to move the zoom lens 105 in the optical axis direction. The zoom motor 106 and the zoom driver 107 constitute a zoom drive unit. A position of the zoom lens 105 is detected by a zoom lens position detector 108.

A variable aperture stop (aperture stop) 109 is connected to an iris motor 110. The iris motor 110 is driven by an iris driver 111 so as to drive the variable aperture stop 109. The iris motor 110 and the iris driver 111 constitute an iris drive unit. A position (opening degree) of the variable aperture stop 109 is detected by an iris position detector 112.

A spectral prism 113 separates light having passed through the focus lens 101 and the zoom lens 105 into two light beams. One of the light beams having passed through the spectral prism 113 passes through a relay lens 123 and enters an image pickup element 124. On the other hand, the other light beam reflected by the spectral prism 113 enters a phase difference detecting type focus detector 114. The focus detector 114 includes a phase difference detection lens and a phase difference detection sensor, and the phase difference detection sensor performs photoelectric conversion of a pair of images (two images) formed by the two light beams separated by the phase difference detection lens.

A lens controller 115 of the autofocus apparatus controls driving of the focus lens drive unit, the zoom lens drive unit, and the iris drive unit. A defocus amount calculator 117 calculates a phase difference of a pair of image signals as a part of an image pickup light beam after the photoelectric conversion by the focus detector 114, and calculates a defocus amount of a predetermined object. A depth-of-field calculator 116 calculates (or may read from a table) a depth of field on the supposition that an object to be focused is in focus, based on position information of the focus lens 101, the zoom lens 105, and the variable aperture stop 109, and the defocus amount. A focus lens target position calculator 118 serving as a target position calculator calculates a focus lens target position based on the defocus amount calculated by the defocus amount calculator 117 and the position information of the focus lens position detector 104. An object speed calculator 119 calculates a moving speed of the object in the optical axis direction based on the time (target position calculation time) consumed for calculation by the focus lens target position calculator 118 or time consumed for focus detection (for obtaining the pair of image signals) by the focus detector 114, and information from the focus lens target position calculator 118. A focus lens drive amount calculator 120 serving as a driving amount calculator calculates a driving amount of the focus lens 101 based on information from the focus lens target position calculator 118 and the focus lens position detector 104. A focus lens drive speed setting unit 121 serving as a first drive speed setting unit sets a focus lens drive speed based on information from the focus lens drive amount calculator 120 and the object speed calculator 119. Although the focus lens drive speed setting unit 121 is set as the first drive speed setting unit, a unit which has the function of the focus lens drive amount calculator 120 and the function of the focus lens drive speed setting unit 121 can be set as the first drive speed setting unit. A focus lens drive speed adjusting unit 122 serving as a second drive speed setting unit determines as to whether or not the focus lens drive speed is appropriate for the object speed based on information from the depth-of-field calculator 116, the object speed calculator 119, the focus lens drive speed setting unit 121, and the defocus amount calculator 117. When determined to be inappropriate, the focus lens drive speed is changed.

The configuration described above is described below in detail with reference to a flowchart of FIG. 2, a focus lens driving speed adjustment process flowchart of FIG. 3, and a locus of a lens focal length of FIG. 5.

Figure 2:
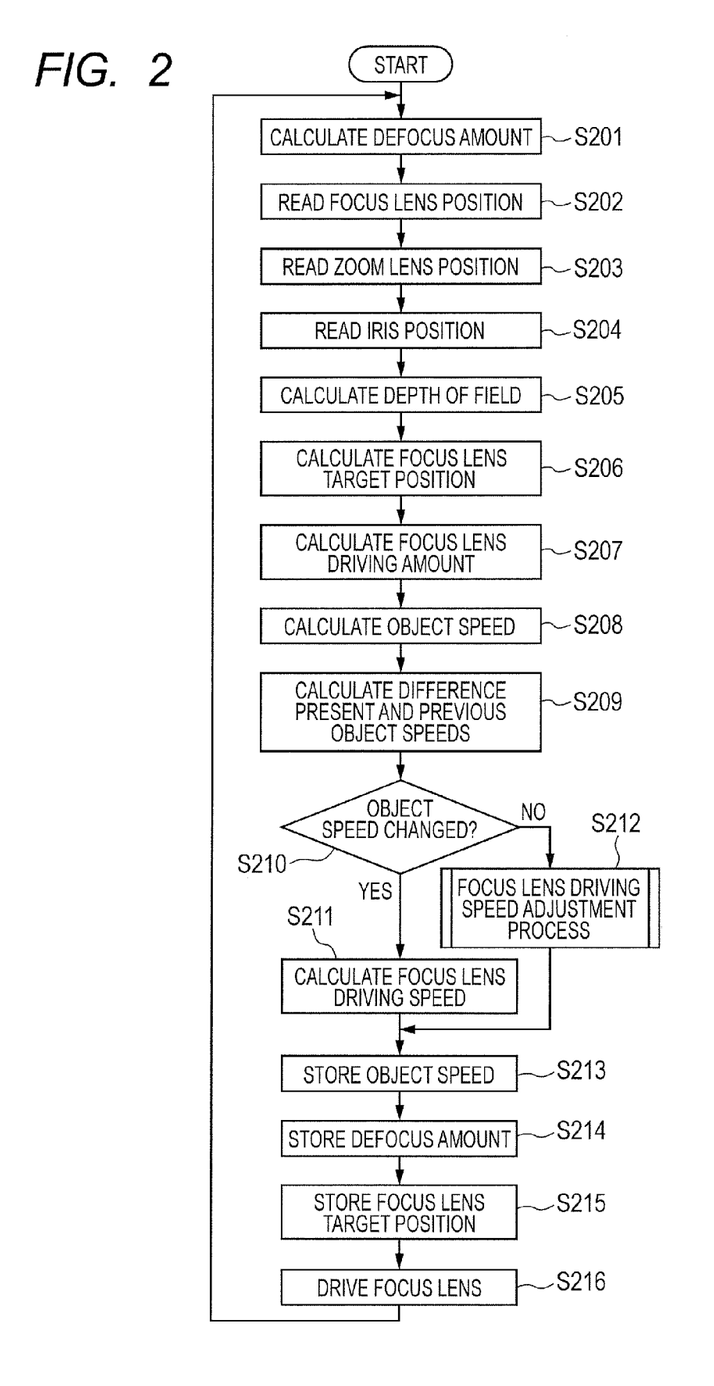
FIG. 2 is a main flowchart of the first embodiment.

In S201 of FIG. 2, the defocus amount calculator 117 calculates a phase difference of the pair of image signals as a part of the image pickup light beam after the photoelectric conversion by the focus detector 114 so as to calculate a defocus amount. In Step S202, a focus lens position detected by the focus lens position detector 104 is read. In S203, a zoom lens position detected by the zoom lens position detector 108 is read. In S204, an iris position detected by the iris position detector 112 is read. In S205, the depth-of-field calculator 116 calculates front and rear depths of field in a case where an object to be focused is in focus based on the focus lens position, the zoom lens position, and the iris position by using Expressions (1) and (2).

$$\text{front depth of field} = (\sigma \times Fno \times L \times L)/(f \times f - \sigma \times Fno \times L) \quad (1)$$

$$\text{rear depth of field} = (\sigma \times Fno \times L \times L)/(f \times f + \sigma \times Fno \times L) \quad (2)$$

In the expressions, σ represents a diameter of the permissible circle of confusion, f represents a focal length, L represents an object distance, and Fno represents an F number. Here, the depths of field are calculated by the above-mentioned expressions. However, this is not a limitation, and it is possible to read the depth of field from a table or the like. In addition, the diameter of the permissible circle of confusion σ is a known value determined by the type (size or pixel pitch) of the image pickup element, the use thereof (photographing mode), or the like. For example, the diameter of the permissible circle of confusion σ can be 0.04 mm for the size of image pickup element (image size) of P (1¼ inch), 0.03 mm for PV (1 inch), 0.021 mm for J (⅔ inch) and 0.016 mm for PH (½ inch). Moreover, the diameter of the permissible circle of confusion σ can be generally 0.5 to 2 times the pixel pitch. Here, the in-focus state can be maintained in the zoom lens position and an iris state when the defocus amount is calculated, by controlling the focus lens to be positioned within the front depth of field and the rear depth of field with the calculated object distance as a reference.

In S206, the focus lens target position calculator 118 calculates a focus lens target position corresponding to a present object distance from the defocus amount calculated in S201 and the focus lens position read in S202. In S207, the focus lens drive amount calculator 120 calculates a driving amount of the focus lens 101 based on the present focus lens target position calculated in S206 and the focus lens position read in S202. In S208, the object speed calculator 119 calculates an object speed in the optical axis direction by using Expression (3) based on the time (target position calculation time) consumed for calculation by the focus lens target position calculator 118 or the time consumed for focus detection (for obtaining the pair of image signals) by the focus detector 114, the present focus lens target position, and a previous or preceding focus lens target position stored in the target position memory (not shown) (a focus lens target position calculated prior to calculating of the present focus lens target position). In the following, for a simple description, the object speed refers to an object speed in the optical axis direction.

$$V = (fct1 - fct10)/T \tag{3}$$

In the expression, V represents a change of the focus lens target position per unit time. (It is possible to determine the object speed from a change of the focus lens target position per unit time. In addition, in the following process, the object speed may be used instead of the change of the focus lens target position. Therefore, in the following description, V is referred to as "object speed".) Further, fct1 represents a present focus lens target position, and fct10 represents the previous or preceding focus lens target position. In addition, T represents the period of time elapsed from a time at which the focus lens target position calculator 118 calculates the previous or preceding focus lens target position fct10 (a focus lens target position fct10 calculated prior to calculating of the present focus lens target position) to a time at which the focus lens target position calculator 118 calculates the present focus lens target position fct1 (target position calculation time). As the period of time T, instead of the target position calculation time, it is possible to use the period of time that can be regarded as equivalent to the target position calculation time. As the period of time that can be regarded as equivalent to the target position calculation time, for example, it is possible to use the period of time elapsed from a time at which the focus detector 114 obtains the pair of image signals necessary for calculating the previous or preceding focus lens target position fct10 to a time at which the focus detector 114 obtains the pair of image signals necessary for calculating the focus lens target position fct1 (focus detection time). Here, the value of V is positive in a direction of moving toward an infinity side. In S209, an object speed V0 calculated in the previous or preceding process loop and stored in a memory (not shown) in the lens controller 115 is subtracted from an object speed Vnow calculated in S208, to thereby calculate a change amount ΔV of the object speed.

$$\Delta V = V\text{now} - V0 \tag{4}$$

In S210, using Expression (5), it is determined whether or not the object speed has changed in a predetermined period of time:

$$|\Delta V| < \alpha 1 \tag{5},$$

where α1 represents a predetermined positive threshold (first threshold). When an absolute value of the change amount ΔV of the object speed in Expression (5) is α1 or larger (the first threshold or larger), it is determined that the object speed has changed, and the process proceeds to S211. In addition, when the object has not moved in the optical axis direction, namely, when the object speed V0 stored in the memory (not shown) in the lens controller 115 is 0, the process proceeds to S211. When the absolute value of the change amount ΔV of the object speed is smaller than α1, it is determined that the object speed has not changed, and the process proceeds to S212. In S212, the focus lens drive speed adjusting unit 122 determines whether or not the present focus lens drive speed is appropriate for the object speed calculated in S208. In S211, the focus lens drive speed setting unit 121 reads (or may calculate) the focus lens drive speed from a table based on the focus lens driving amount calculated in S207 and the object speed calculated in S208 so as to set the focus lens drive speed, and the process proceeds to S213.

Figure 3:
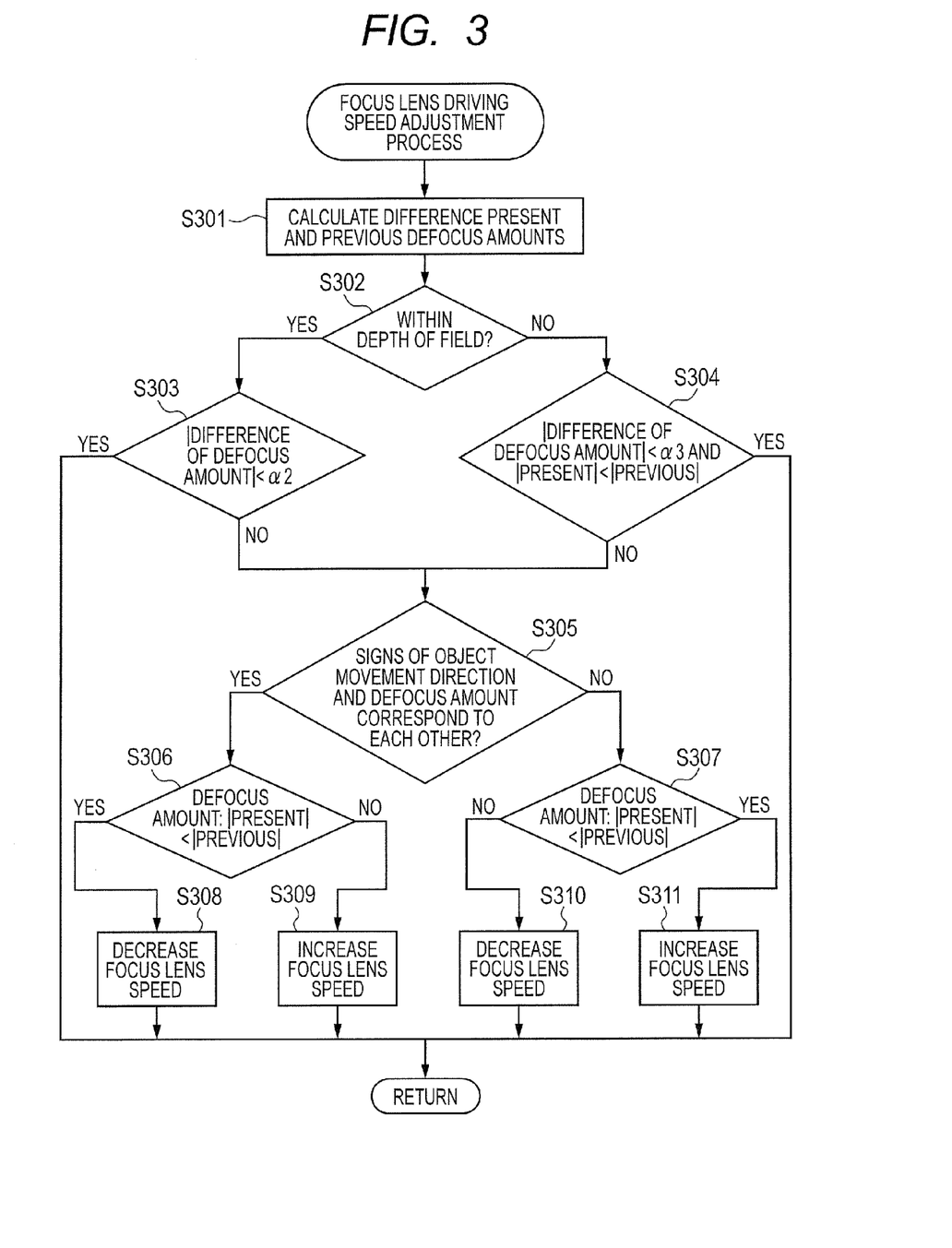
FIG. 3 is a focus lens driving speed adjustment process flowchart of the first embodiment.

FIG. 3 illustrates details of the process by the focus lens drive speed adjusting unit 122 in S212. In S301 of FIG. 3, a previous or preceding defocus amount d0 stored in a defocus amount memory (not shown) is subtracted from a present defocus amount dnow calculated in S201 so as to calculate a change amount Δd of the defocus amount within a predetermined period of time.

$$\Delta d = d\text{now} - d0 \tag{6}$$

In S302, it is determined whether or not the focus lens is positioned within the depth of field at present based on the focus lens position read in S202, the depth of field calculated in S205, and the defocus amount calculated in S201. When the focus lens is positioned within the depth of field, the process proceeds to S303. When the focus lens is not positioned within the depth of field, the process proceeds to S304. In S303 and S304, it is determined whether or not the present focus lens drive speed is appropriate for the present object speed. In S303, using Expression (7), it is determined whether or not the present focus lens drive speed is appropriate:

$$|\Delta d| < \alpha 2 \tag{7},$$

where α2 represents a positive threshold (second threshold). When the absolute value of the change amount Δd of the defocus amount is α2 or larger (second threshold or larger), it is determined that the focus lens drive speed is inappropriate, and the process proceeds to S305. When the absolute value of the change amount Δd of the defocus amount is smaller than α2, it is determined that the focus lens drive speed is appropriate. The focus lens driving speed adjustment process is then finished, and the process proceeds to S213 of FIG. 2.

In S304, it is determined whether or not the present focus lens drive speed is appropriate based on whether or not both Expressions (8) and (9) are satisfied:

$$|\Delta d| > \alpha 3 \tag{8; and}$$

$$|d\text{now}| < |d0| \tag{9},$$

where α3 represents a positive threshold (third threshold). When the absolute value of the change amount Δd of the defocus amount is α3 or smaller (third threshold or smaller) or when an absolute value of dnow is equal to or larger than the absolute value of d0, it is determined that the focus lens drive speed is inappropriate, and the process proceeds to S305. When the absolute value of the change amount Δd of the defocus amount is larger than α3 and the absolute value of dnow is smaller than the absolute value of d0, it is determined that the focus lens drive speed is appropriate. The focus lens driving speed adjustment process is then finished, and the process proceeds to S213 of FIG. 2.

In S305, it is determined whether or not a sign of an object moving direction (a sign of the object speed V) and a sign of the present defocus amount dnow determined in S201 correspond to each other. Here, the sign of the object moving direction is as described above. That is, the front depth of field side is regarded as negative, and the rear depth of field side is regarded as positive. In addition, the present defocus amount dnow has a positive sign when the actual object distance is on the long distance side with respect to a focused object distance of the focus lens, and has a negative sign when the actual object distance is on the short distance side with respect to a focused object distance of the focus lens.

When the signs of the object moving direction and the present defocus amount are the same, the process proceeds to S306. When the signs of the object moving direction and the present defocus amount are different, the process proceeds to S307.

In S306 and S307, it is determined whether or not the absolute value of the defocus amount dnow calculated in the present routine is smaller than the absolute value of the defocus amount d0 calculated in the previous or preceding process loop and stored in the memory (not shown) (a focus amount d0 obtained prior to obtaining of the present defocus amount).

$$|d\text{now}| < |d0| \tag{10}$$

Figure 5:
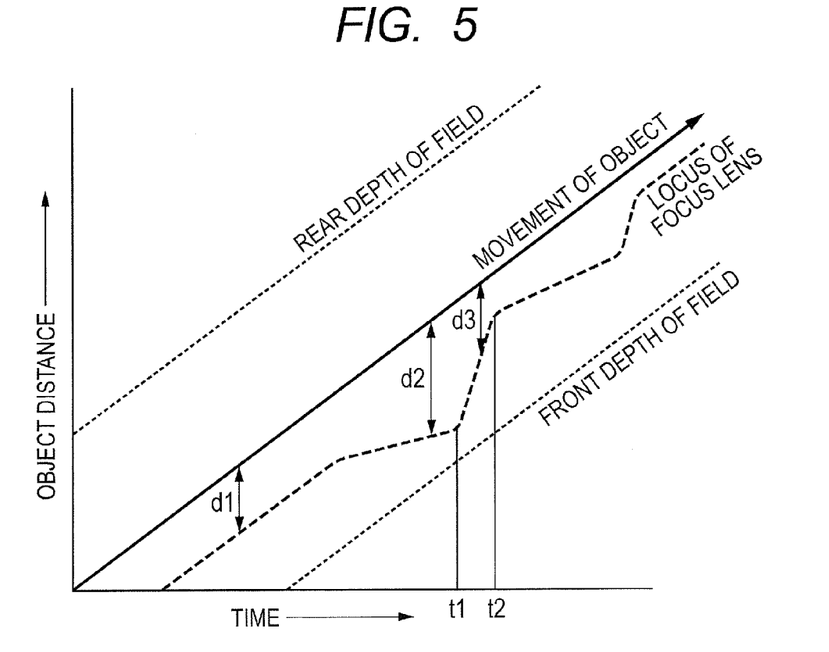
FIG. 5 shows a locus of a focal length of a lens to which the first embodiment is applied.

In a case of d2 in FIG. 5, it is determined that the absolute value of the defocus amount is increased. In a case of d3, it is determined that the absolute value of the defocus amount is decreased.

In S306, using Expression (10), when |dnow| is smaller than |d0|, the process proceeds to S308. When |dnow| is equal to or larger than |d0|, the process proceeds to S309. In S307, using Expression (10), when |dnow| is smaller than |d0|, the process proceeds to S311. When |dnow| is equal to or larger than |d0|, the process proceeds to S310. In S308 and S310, using Expression (11), the present focus lens speed is decelerated while maintaining the moving direction (the drive speed between the points of time t1 and t2 in FIG. 5 is decelerated to the speed after t2). The focus lens driving speed adjustment process is then finished, and the process proceeds to S213 of FIG. 2. In S309 and S311, using Expression (11), the present focus lens speed is accelerated while maintaining the moving direction (the drive speed before the time point t1 in FIG. 5 is accelerated to the speed between t1 and t2). The focus lens driving speed adjustment process is then finished, and the process proceeds to S213 of FIG. 2.

$$Xnew = Xnow + \beta \times \gamma \tag{11}$$

In the expression, Xnew represents a focus lens drive speed calculated in S308, S309, S310, and S311, Xnow represents a present focus lens drive speed, β represents a value determined by the present defocus amount and the previous or preceding defocus amount, and γ represents an arbitrary constant.

Figure 6A:
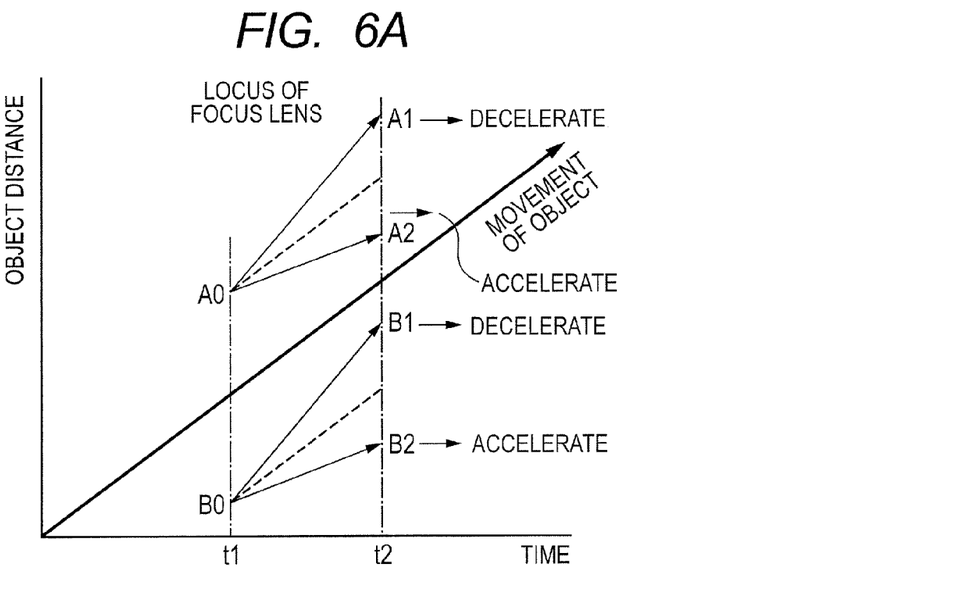
FIGS. 6A and 6B are diagrams showing determination of a focus lens drive speed in the first embodiment.
Figure 6B:
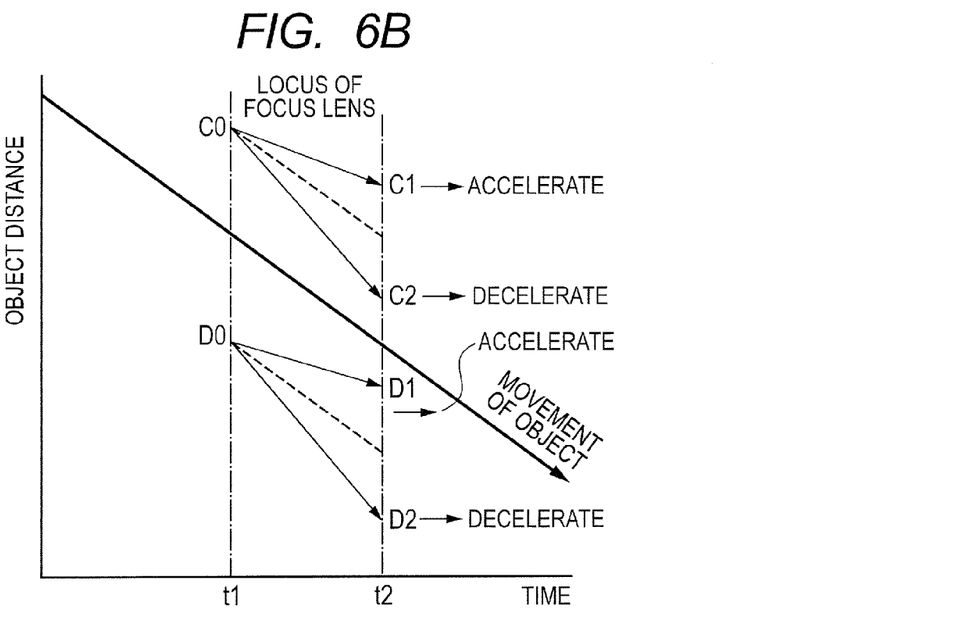

Here, the process of S305 to S311 of FIG. 3 is described in detail with reference to FIGS. 6A and 6B. In the case where the process proceeds from S303 to S305, the object distance changes in one direction under a condition of a constant speed (S210), and the focus lens position is within the depth of field with the object distance as a reference. In addition, in this case, an absolute value of the defocus amount difference is a predetermined threshold or larger (S303), which means that the speed of changing the defocus amount is a predetermined value or larger. In addition, in the case where the process proceeds from S304 to S305, the focus lens position is not within the depth of field with the object distance as a reference (S302), and the focus lens is not moving to the object position at a predetermined speed or higher (S304). This state is illustrated in FIGS. 6A and 6B in four cases in accordance with the sign of the defocus amount and the sign of the object moving direction. FIG. 6A shows the case where the object moving direction is positive (the object distance is changing to the long distance side), and FIG. 6B shows the case where the object moving direction is negative (the object distance is changing to the short distance side).

FIG. 6A shows a case A0 where the defocus amount determined in S201 is negative at the time point t1 (the focus lens position is on the long distance side of the object distance) and a case B0 where the defocus amount is positive at the time point t1 (the focus lens position is on the short distance side of the object distance). The cases where the focus lens in the states A0 and B0 changes in parallel to the change of the object distance are both indicated by dotted lines in FIG. 6A. In this case, the defocus amount at the time point t1 and the defocus amount at the time point t2 are not different from each other. In contrast, considering a sign that is positive on the long distance side, when the focus lens position is changed from A0 to A1, or when the focus lens position is changed from B0 to B2, the absolute value of the defocus amount is increased. In this case, in order to set closer to the in-focus position, the speed is decelerated in the case of A1, and is accelerated in the case of B2. In addition, when the focus lens position is changed from the case of A0 to the case of A2, or is changed from the case of B0 to the case of B1, the absolute value of the defocus amount is decreased. In this case, in order to prevent an excessively rapid approach to the in-focus position or surpassing of the in-focus position, the speed is accelerated in the case of A2, and is decelerated in the case of B1.

FIG. 6B shows a case C0 where the defocus amount determined in S201 is negative at the time point t1 (the focus lens position is on the long distance side of the object distance) and a case D0 where the defocus amount is positive at the time point t1 (the focus lens position is on the short distance side of the object distance). The cases where the focus lens in the states C0 and D0 changes in parallel to the change of the object distance are both indicated by dotted lines in FIG. 6B. In this case, the defocus amount at the time point t1 and the defocus amount at the time point t2 are not different from each other. In contrast, considering a sign that is positive on the long distance side, when the focus lens position is changed from C0 to C1, or when the focus lens position is changed from D0 to D2, the absolute value of the defocus amount is increased. In this case, in order to set closer to the in-focus position, the speed is accelerated in the case of C1, and is decelerated in the case of D2. In addition, when the focus lens position is changed from the case of C0 to the case of C2, or is changed from the case of D0 to the case of D1, the absolute value of the defocus amount is decreased. In this case, in order to prevent an excessively rapid approach to the in-focus position, the speed is decelerated in the case of C2, and is accelerated in the case of D1.

Figure 4:
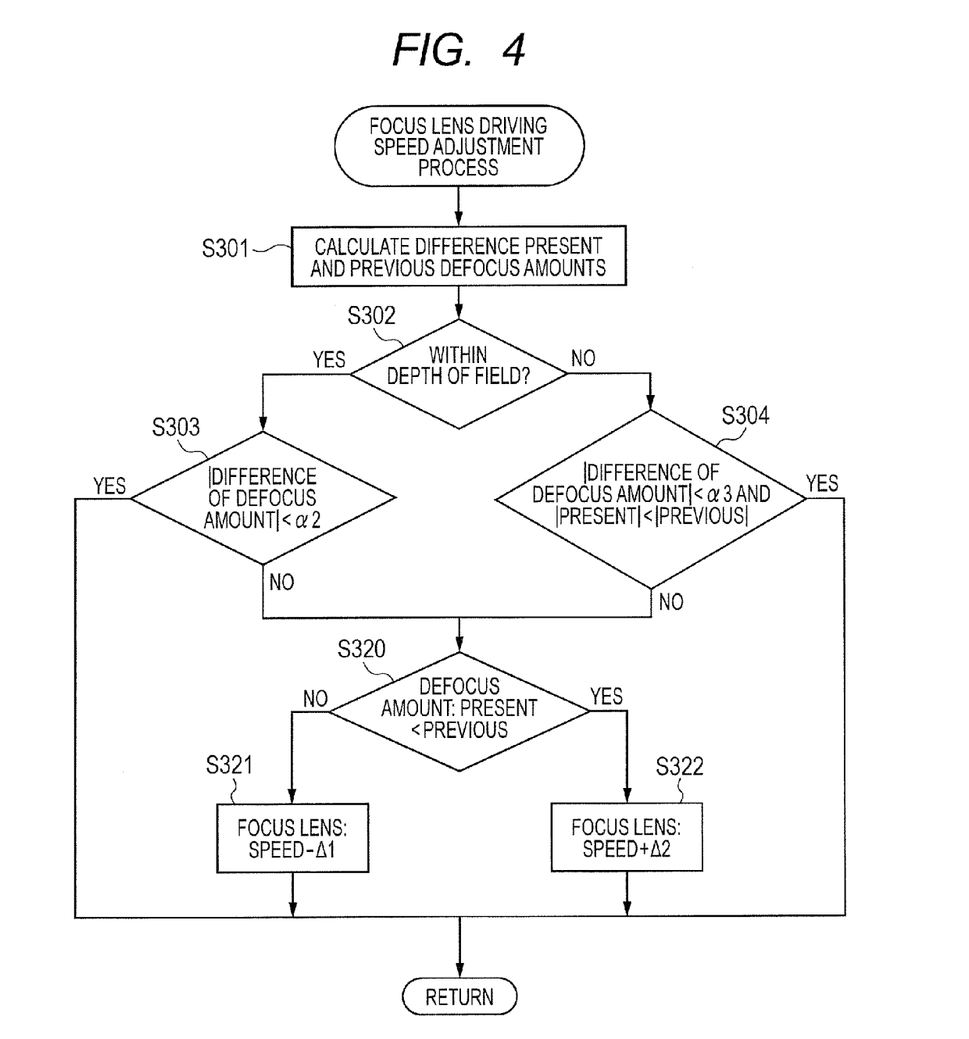
FIG. 4 is another focus lens driving speed adjustment process flowchart of the first embodiment.

Note that, the process from S305 to S311 in the focus lens driving speed adjustment process illustrated in FIG. 3 can be summarized as the process from S320 to S322 as illustrated in FIG. 4. When it is determined to be No in S303 or S304, the process proceeds to S320. In S320, instead of the determination based on the absolute value of the defocus amount in S306 or S307 in the process of FIG. 3, determination is based on an increase or a decrease of the defocus amount including the sign. When the present defocus amount is decreased from the previous one, the process proceeds to S321. When the present defocus amount is equal to or larger than the previous defocus amount, the process proceeds to S322. In S321 and S322, the present focus lens drive speed is accelerated or decelerated with the drive direction of the focus lens for moving the in-focus position to the infinity side being positive and without changing the drive direction. Specifically, in S321, the present drive speed is decelerated. (The drive speed is decreased by Δ1 (Δ1>0) in the case of driving to move the in-focus position to the infinity side, and the drive speed is increased by Δ1 in the case of driving to move the in-focus position to the short distance side.) In S322, the present drive speed is accelerated. (The moving speed is increased by Δ2 (Δ2>0) in the case of driving to move the in-focus position to the infinity side, and the moving speed is decreased by Δ2 in the case of driving to move the in-focus position to the short distance side.)

In S213, the object speed calculated in S208 is stored in the memory (not shown) in the lens controller 115. In S214, the defocus amount calculated in S201 is stored in the memory. In S215, the focus lens target position calculated in S206 is stored in the memory, and the process proceeds to S216. In S216, the focus lens is driven at the focus lens drive speed set by the above-mentioned operation, and the process returns to S201 so as to repeat the series of operation.

Second Embodiment

Figure 7:
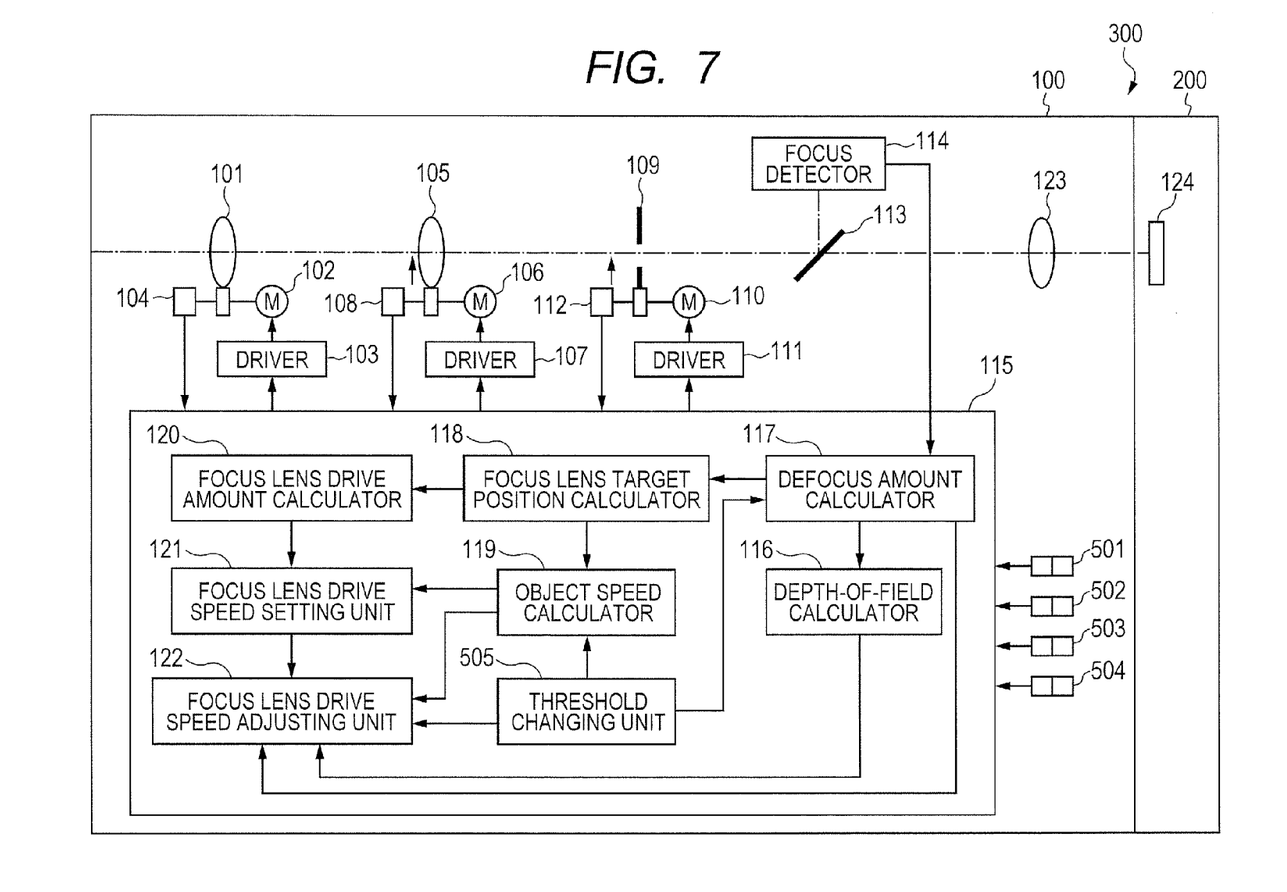
FIG. 7 is a configuration diagram of a second embodiment of the present invention.

FIG. 7 is a structural diagram of an autofocus apparatus according to a second embodiment of the present invention.

Description of the same components as in the first embodiment illustrated in FIG. 1 is omitted, and parts different from those of the first embodiment are described below.

The autofocus apparatus of the second embodiment includes, in addition to the components in the first embodiment, a threshold changing unit 505, a switch 501 (first changing unit), a switch 502 (second changing unit), a switch 503 (third changing unit), and a switch 504 (fourth changing unit).

The threshold changing unit 505 changes the thresholds $\alpha 1$, $\alpha 2$, and $\alpha 3$, and the constant $\gamma$ in Expressions (5), (7), (8), and (11) to arbitrary values input by the switches 501, 502, 503, and 504 as the changing units. Here, the arbitrary values are input by the switches for a simple description, but the switches may be replaced by other units that can set arbitrary values.

Figure 8:
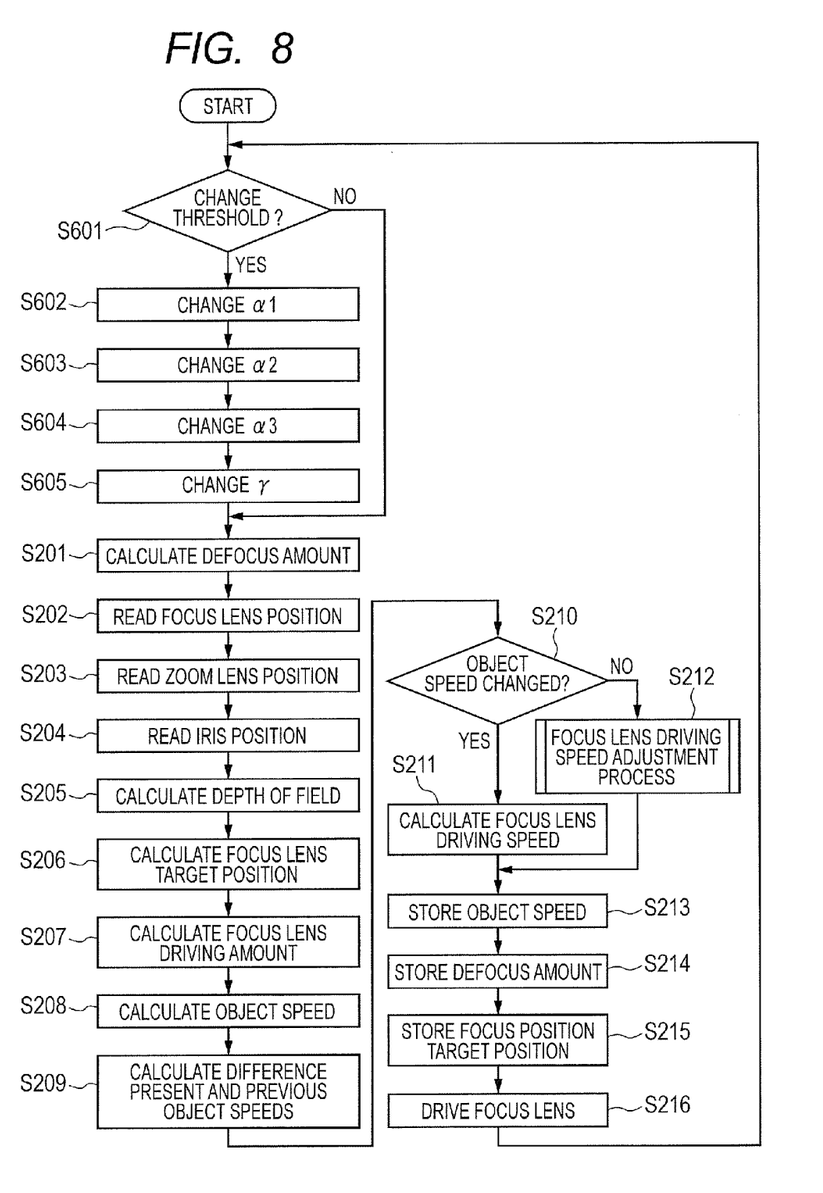
FIG. 8 is a flowchart of the second embodiment.

The operation in this configuration is described with reference to a flowchart of FIG. 8. In FIG. 8, S201 to S215 are the same as those in the flowchart of FIG. 2, and therefore description thereof is omitted. In S601, the threshold changing unit 505 determines whether or not there is a request to change the thresholds by the switches 501, 502, 503, and 504. When there is a request to change, the process proceeds to S602. When there is no change, the process proceeds to S201. In S602, the threshold changing unit 505 reads a value input by the switch 501 and changes the threshold as a reference for determining a change of the object speed ($\alpha 1$ in Expression (5)) to the read arbitrary value. In S603, the threshold changing unit 505 reads an input value from the switch 502 and changes the threshold ($\alpha 2$) to the input value, which is a reference for determining whether or not the present defocus amount has changed from the previous or preceding defocus amount when the present focus lens is within the depth of field. In S604, the threshold changing unit 505 reads an input value from the switch 503 and changes the threshold ($\alpha 3$) to the input value, which is a reference for determining whether or not the present defocus amount has changed from the previous or preceding defocus amount when the present focus lens is not within the depth of field. In S605, the threshold changing unit 505 reads an input value from the switch 504, changes sensitivity ($\gamma$) for adjusting the present focus lens drive speed to the input value, and the process proceeds to S201. In S216, the focus lens is driven at a set focus lens drive speed, and the process returns to S601 so as to repeat the series of operation.

In the above-mentioned embodiments, there is exemplified such control that the focus lens is positioned within the front and rear depths of field on the precondition that the focus lens is focused at the object distance, but the present invention is not limited thereto. Note that, the above-mentioned action and effect of the present invention can be obtained also by performing control so that the object is set within the front and rear depths of field with the present focus lens position as a reference.

In the exemplified embodiments, a part of the image pickup light beam is separated and is guided to the focus detector 114 so as to calculate the defocus amount, but the present invention is not limited to this configuration. For instance, the effect of the present invention can be obtained also by disposing an optical system for focus detection separately from the image pickup optical system, and calculating the defocus amount based on a light beam having passed through the optical system.

The exemplary embodiments of the present invention are described above. However, the present invention is not limited to the embodiments and can be modified and changed variously within the gist thereof. In addition, a lens apparatus including the autofocus apparatus of the present invention or an image pickup apparatus including the lens apparatus and a camera apparatus including an image pickup element for receiving object light from the lens apparatus can obtain the above-mentioned effect of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-115283, filed May 21, 2012, which is hereby incorporated by reference herein in its entirety.

What is claimed is:

1. An autofocus apparatus comprising:
   a memory; and
   a lens controller, which includes a processor, configured to execute:
   a target position calculating task that calculates a target position of a focus lens based on a defocus amount obtained based on a signal from a focus detector of a phase difference detecting type and a position of the focus lens obtained by a position detector;
   a target position storing task that stores in the memory the calculated target position;
   an object speed calculating task that calculates an object speed in an optical axis direction based on a present target position, a target position calculated prior to calculating of the present target position, and one of a target position calculation time consumed from a time at which the target position calculating task calculates the target position calculated prior to calculating of the present target position to a time at which the target position calculating task calculates the present target position or a time regarded as equivalent to the target position calculation time;
   a first drive speed setting task that sets a drive speed of the focus lens based on the present target position, the position of the focus lens, and the object speed;
   a second drive speed setting task that sets the drive speed of the focus lens based on a present drive speed of the focus lens, a present defocus amount, and the defocus amount obtained prior to obtaining of the present defocus amount;
   an object speed change determining task that determines whether or not the object speed changes;
   a first driving task that drives the focus lens based on the drive speed set by the first drive speed setting task in a case where the object speed has been determined to change; and
   a second driving task that drives the focus lens based on the drive speed set by the second drive speed setting task in a case where the object speed has been determined to not change.

2. An autofocus apparatus according to claim 1, wherein:
   the object speed change determining task further determines whether an absolute value of a change amount of the object speed is smaller than, or equal to or larger than, a predetermined threshold,
   the object speed change determining task determines that the object speed does not change in a case where the absolute value of the change amount of the object speed is determined to be smaller than the predetermined threshold, and
   the object speed change determining task determines that the object speed changes in a case where the absolute value of the change amount of the object speed is determined to be equal to or larger than the predetermined threshold.

3. An autofocus apparatus according to claim 2, further comprising a changing unit that changes the predetermined threshold to an arbitrary value.

4. An autofocus apparatus according to claim 1, wherein:
the lens controller is further configured to execute:
a depth-of-field calculating task that calculates a depth of field based on a state of an optical system, which includes the focus lens, a zoom lens, and an aperture stop; and
a defocus amount change determining task that determines whether an absolute value of a change amount of the defocus amount, within a predetermined period of time, is equal to or larger than a predetermined threshold, and
the second drive speed setting task changes the drive speed of the focus lens in a case where a present object is within the calculated depth of field and the absolute value of the change amount of the defocus amount, within the predetermined period of time, is determined to be is equal to or larger than the predetermined threshold.

5. An autofocus apparatus according to claim 4, wherein the second drive speed setting task changes the drive speed of the focus lens by:
decelerating the drive speed in a case where the defocus amount is decreased and the focus lens is driven to an infinity side;
accelerating the drive speed in a case where the defocus amount is decreased and the focus lens is driven to a short distance side;
accelerating the drive speed in a case where the defocus amount is one of increased or unchanged, and the focus lens is driven to the infinity side; and
decelerating the drive speed in a case where the defocus amount is one of increased or unchanged, and the focus lens is driven to the short distance side.

6. An autofocus apparatus according to claim 4, further comprising a changing unit that changes the predetermined threshold to an arbitrary value.

7. An autofocus apparatus according to claim 4, wherein the depth-of-field calculating task calculates the depth of field based on the position of the focus lens obtained by the position detector, a position of a zoom lens, and a position of an aperture stop.

8. An autofocus apparatus according to claim 1, wherein:
the lens controller is further configured to execute:
a depth-of-field calculating task that calculates a depth of field based on a state of an optical system, which includes the focus lens, a zoom lens, and an aperture stop; and
a defocus amount change determining task that determines whether an absolute value of a change amount of the defocus amount, within a predetermined period of time, is equal to or smaller than a predetermined threshold, and
the second drive speed setting task changes the drive speed of the focus lens in any one of a case where a present object is not within the calculated depth of field and the absolute value of the change amount of the defocus amount, within the predetermined period of time, is equal to or smaller than a predetermined threshold or a case where the present object is not within the calculated depth of field and the absolute value of the present defocus amount is equal to or larger than the absolute value of the defocus amount obtained prior to obtaining the present defocus amount.

9. An autofocus apparatus according to claim 8, wherein the second drive speed setting task changes the drive speed of the focus lens by:
decelerating the drive speed in a case where the defocus amount is decreased and the focus lens is driven to an infinity side;
accelerating the drive speed in a case where the defocus amount is decreased and the focus lens is driven to a short distance side;
accelerating the drive speed in a case where the defocus amount is one of increased or unchanged, and the focus lens is driven to the infinity side; and
decelerating the drive speed in a case where the defocus amount is one of increased or unchanged, and the focus lens is driven to the short distance side.

10. An autofocus apparatus according to claim 8, further comprising a changing unit that changes the predetermined threshold to an arbitrary value.

11. An apparatus comprising:
an optical system including a focus lens, a zoom lens, and an aperture stop;
a position detector configured to detect a position of the focus lens, a position of the zoom lens, and a position of the aperture stop; and
an autofocus apparatus comprising:
a memory; and
a lens controller, which is a processor, configured to execute:
a target position calculating task that calculates a target position of the focus lens based on a defocus amount obtained based on a signal from the focus detector of a phase difference detecting type and the position of the focus lens obtained by the position detector;
a target position storing task that stores in the memory the calculated target position;
an object speed calculating task that calculates an object speed in an optical axis direction based on a present target position, a target position calculated prior to calculating of the present target position, and one of a target position calculation time consumed from a time at which the target position calculating task calculates the target position calculated prior to calculating of the present target position to a time at which the target position calculating task calculates the present target position or a time regarded as equivalent to the target position calculation time;
a first drive speed setting task that sets a drive speed of the focus lens based on the present target position, the position of the focus lens, and the object speed;
a second drive speed setting task that sets the drive speed of the focus lens based on a present drive speed of the focus lens, a present defocus amount, and the defocus amount obtained prior to obtaining of the present defocus amount;
an object speed change determining task that determines whether or not the object speed changes;
a first driving task that drives the focus lens based on the drive speed set by the first drive speed setting task in a case where the object speed has been determined to change; and
a second driving task that drives the focus lens based on the drive speed set by the second drive speed setting task in a case where the object speed has been determined to not change.

12. An apparatus according to claim 11, further comprising an image pickup element configured to receive object light from the optical system.

* * * * *